INVENTORS
WILLIAM STELZER
DAVID T. AYERS, JR.
ATTORNEY

United States Patent Office 2,980,066
Patented Apr. 18, 1961

2,980,066

BOOSTER MECHANISM

William Stelzer, Bloomfield Hills, and David T. Ayers, Jr., Birmingham, Mich., assignors to Kelsey-Hayes Company, Detroit, Mich., a corporation of Delaware Filed June 6, 1957, Ser. No. 664,133

9 Claims. (Cl. 121—41)

This invention relates to a booster mechanism, and more particularly to such a mechanism employing a hydraulically operated booster motor especially adapted for use in a vehicle brake system.

An important object of the invention is to provide novel means for transmitting forces from a brake pedal to a valve mechanism and to a master cylinder plunger in such a manner that the booster motor assists the operator in applying the brakes while permitting the operator to manually apply the brakes, in the event of a failure of power in the motor, without having to operate the motor piston.

A further object is to provide such a mechanism wherein the brake pedal is connected to a lever which in turn has connection at spaced points with the valve mechanism and the master cylinder operating rod, and to provide novel means for transmitting forces from the motor piston to the master cylinder plunger independently of the plunger operating rod whereby, upon a failure of power for the motor, the plunger operating rod may be operated by direct pedal actuation without transmitting forces to the motor piston, thus relieving the operator of the necessity for exerting force under such conditions to overcome the friction of the motor piston and the loading of the return spring thereof.

A further object is to provide a booster brake mechanism of the character referred to wherein the motor piston has solely an abutting mechanical engagement with the master cylinder plunger to transmit forces thereto, and wherein a pedal operable rod projects axially through the motor piston to transmit its forces to the master cylinder plunger wholly independently of the motor piston whereby no forces will be transmitted to the latter by the operation of the pedal in the event of failure of power for the motor, whereby all forces exerted by the operator against the brake pedal will be transmitted directly to the master cylinder plunger.

A further object is to provide a mechanism of this character which is characterized by a high degree of compactness and efficiency of operation and wherein forces from the brake pedal are transmitted to the control valve mechanism and to the master cylinder piston through the medium of a lever, and to so construct the valve mechanism that limited movement thereof takes place upon operation of the pedal so that, upon a failure in power for the motor, the valve mechanism moves only a short distance so that most of the movement of the brake pedal will be transmitted through the lever to pedal-actuate the master cylinder piston.

A further object is to provide a mechanism of this character wherein the general organization of elements having the advantages referred to is provided with means for transmitting to the brake pedal two stages of hydraulic reaction during brake actuation.

Other objects and advantages of the invention will become apparent during the course of the following description.

In the drawings I have shown one embodiment of the invention. In this showing:

Figure 1:
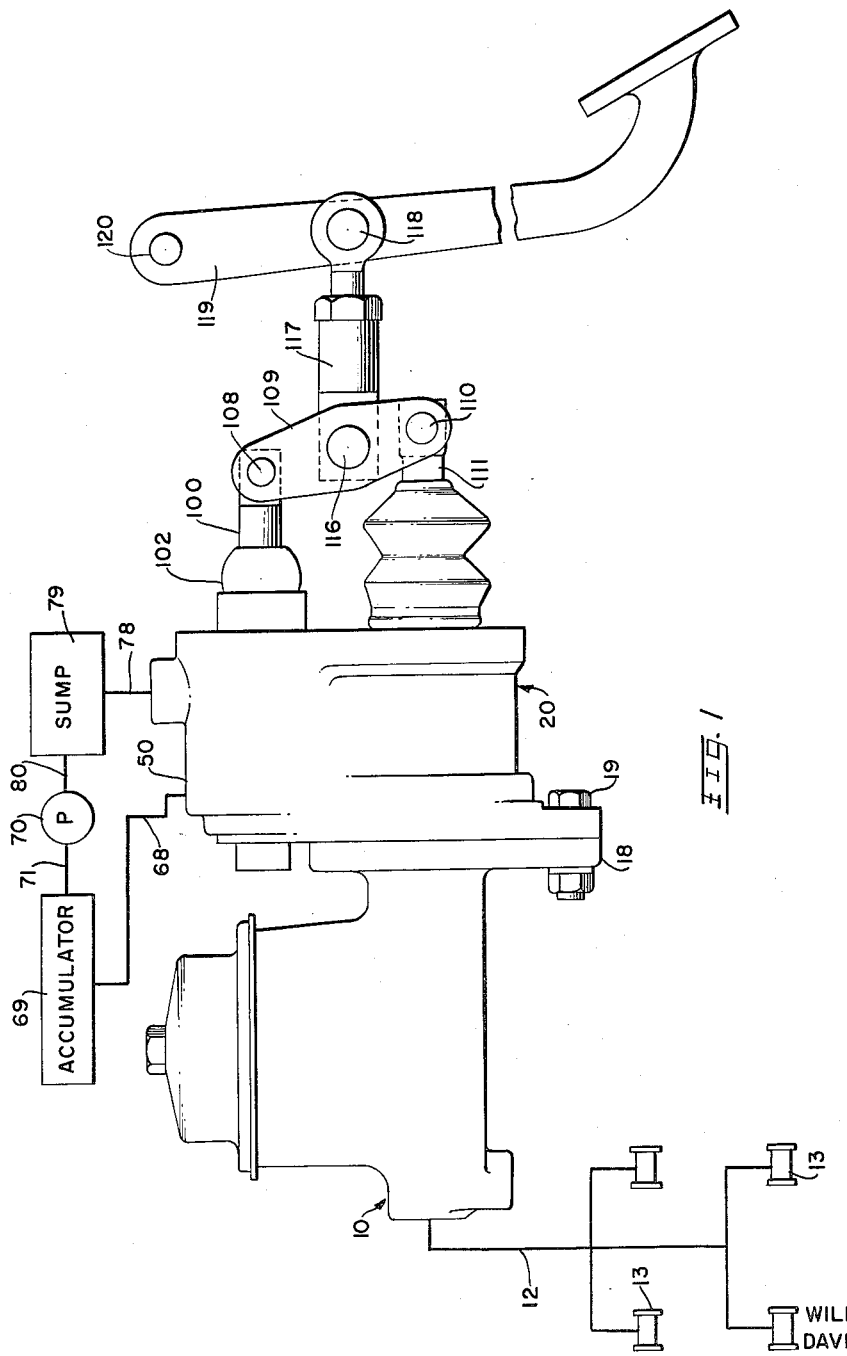
Figure 1 is a side elevation of the mechanism, the fluid circulating system for the motor and the wheel cylinders and their connections being diagrammatically illustrated.

Referring to the drawings, the numeral 10 designates a conventional master cylinder in which is slidable the usual plunger 11 (Figures 2 and 3) for displacing fluid through lines 12 to the usual wheel cylinders 13. The plunger 11 has forces transmitted thereto from the brake pedal, in a manner to be described, through a push rod 13. For the transmission of forces to the plunger 11, the push rod 13 is provided with a ball end 14 arranged in the hemispherical inner end of a recess 15 in the rear end of the plunger 11. This permits a slight rocking movement of the rod 13 relative to the plunger 11 for a reason which will become apparent.

The rear end of the master cylinder 10 is flanged as at 18 to be connected by bolts 19 to a motor body indicated as a whole by the numeral 20. This body has formed therein a cylinder bore 21 in which is slidable a piston 22 normally urged to the off brake position by a return spring 23. The cylinder 21 has a closed head 24 at one end, the space between such head and the piston 22 forming a pressure chamber 25 into which pressure fluid is introduced in a manner to be described, to actuate the piston 22.

Connected to the forward end of the piston 22 is a forwardly extending sleeve 30, the forward end of which is turned inwardly as at 31 to form a shoulder abutting the rear end of the master cylinder plunger 11 to transmit forces to the latter upon operation of the piston 22. The shoulder 31 is formed as a flange the radially inner extremity of which is dished as at 32 to form a seat engageable with a similarly shaped shoulder 33 carried by the rod 13.

An annular stamped ring 35 is arranged in the enlarged forward end portion 36 of the bore 21 and has its radially inner portion shaped to receive sealing means 37 slidably surrounding the sleeve 30 to prevent the leakage of fluid past such sleeve. In the event such leakage occurs, it necessarily will be of a minor nature and leakage fluid is drained from the mechanism through a port 38, thus eliminating any possibility that the fluid employed for actuating the motor will mingle with the fluid of a different nature employed in the brake system. In the enlarged bore 36 is arranged another ring 39, and between the rings 35 and 39 and engaging the bore 36 is arranged a packing ring 40 to assist in preventing the escape of fluid leaking around the piston 22.

A head 24 carries a sleeve 45 welded or otherwise secured thereto and projecting therethrough. The sleeve 45 is smaller than the sleeve 30 and is adapted to extend thereinto, as clearly shown in Figure 2, and the piston 22 is provided with a sealing ring 46 slidably engaging the sleeve 45.

The body 20 has an upper portion 50 (Figures 2 and 3) forming a housing for a valve mechanism for controlling the motor. The housing 50 is provided with a bore 51 in which is arranged a suitable sleeve 52 forming with the bore 51 a chamber 53. Within the sleeve 52 is formed a reaction chamber 54 communicating with the chamber 53 through ports 55. The body 20 is provided with a passage 56 affording constant communication between the chamber 53 and the motor chamber 25.

The sleeve 52 is provided with an end wall 58 having a port 59 therethrough normally engaged by a valve 60 carried by a body 61 the forward end of which slides in sealed relation with a small cylinder 62. The valve 60 is biased to the closed position shown in Figure 2 by a spring 65. This spring is arranged in a chamber 66 which communicates through a port 67 with a line 68 (Figure 1). This line leads to an accumulator 69 in which hydraulic fluid is maintained under pressure by a pump 70 connected thereto by a pipe 71. Upon the opening of the valve 60, in a manner to be described, fluid flows from the accumulator 69 into the chamber 66, through opening 59 and through chambers 54 and 53 and passage 56 into the motor chamber 25 to actuate the piston 22.

A plug 75 is threaded into the valve body 50 at the end thereof opposite the valve body 61 and engages and maintains in position the sleeve 52. The plug 75 has formed therein a low pressure chamber 76 in open communication with a discharge port 77 in the body 50 through ports 78 formed in the wall of the plug 75. The port 77 is connected through a line 78 (Figure 1) with a sump 79, which in turn is piped as at 80 to the intake side of the pump 70.

Figure 2:
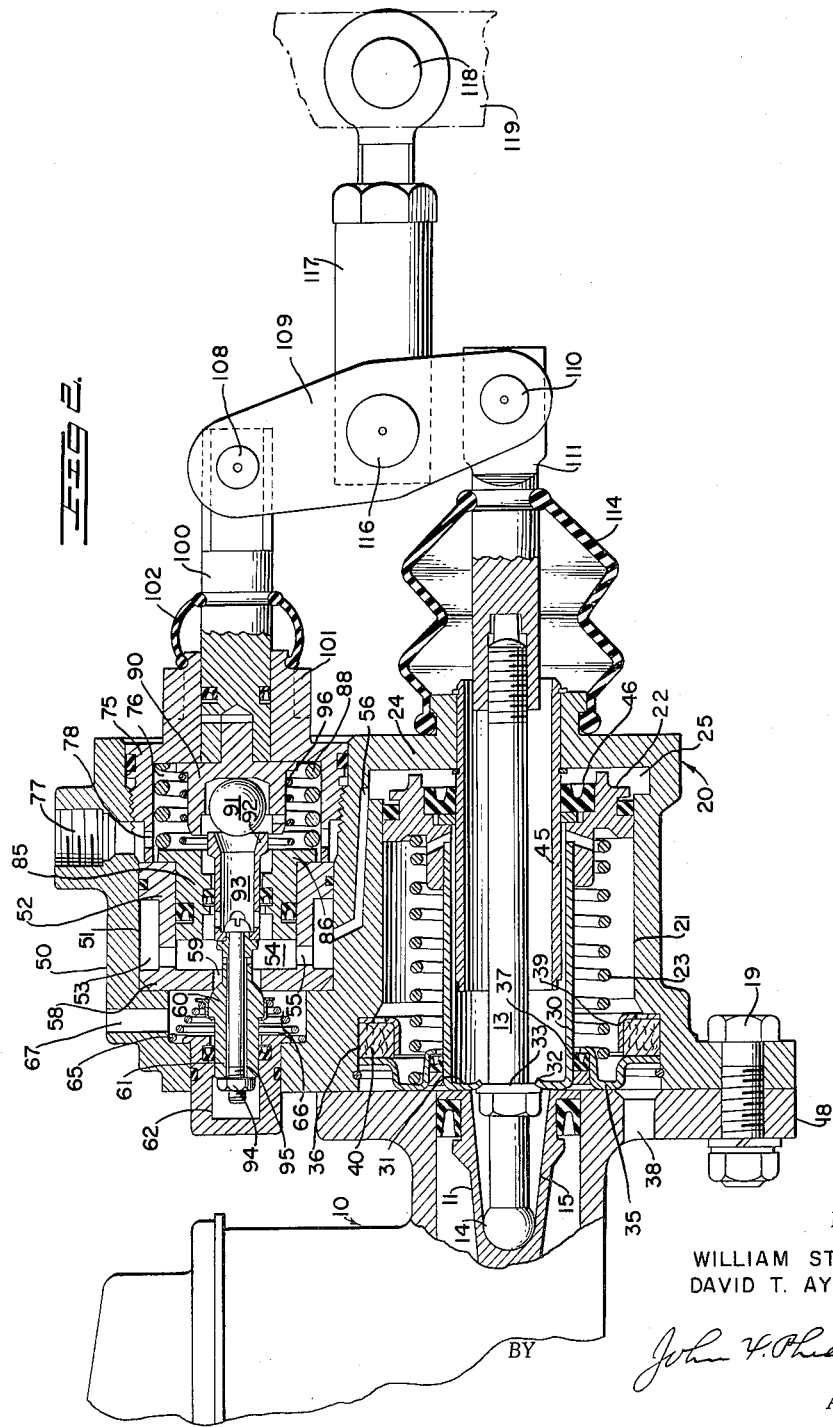
Figure 2 is an enlarged fragmentary sectional view through the motor and associated parts, the elements being shown in normal off positions.
Figure 3:
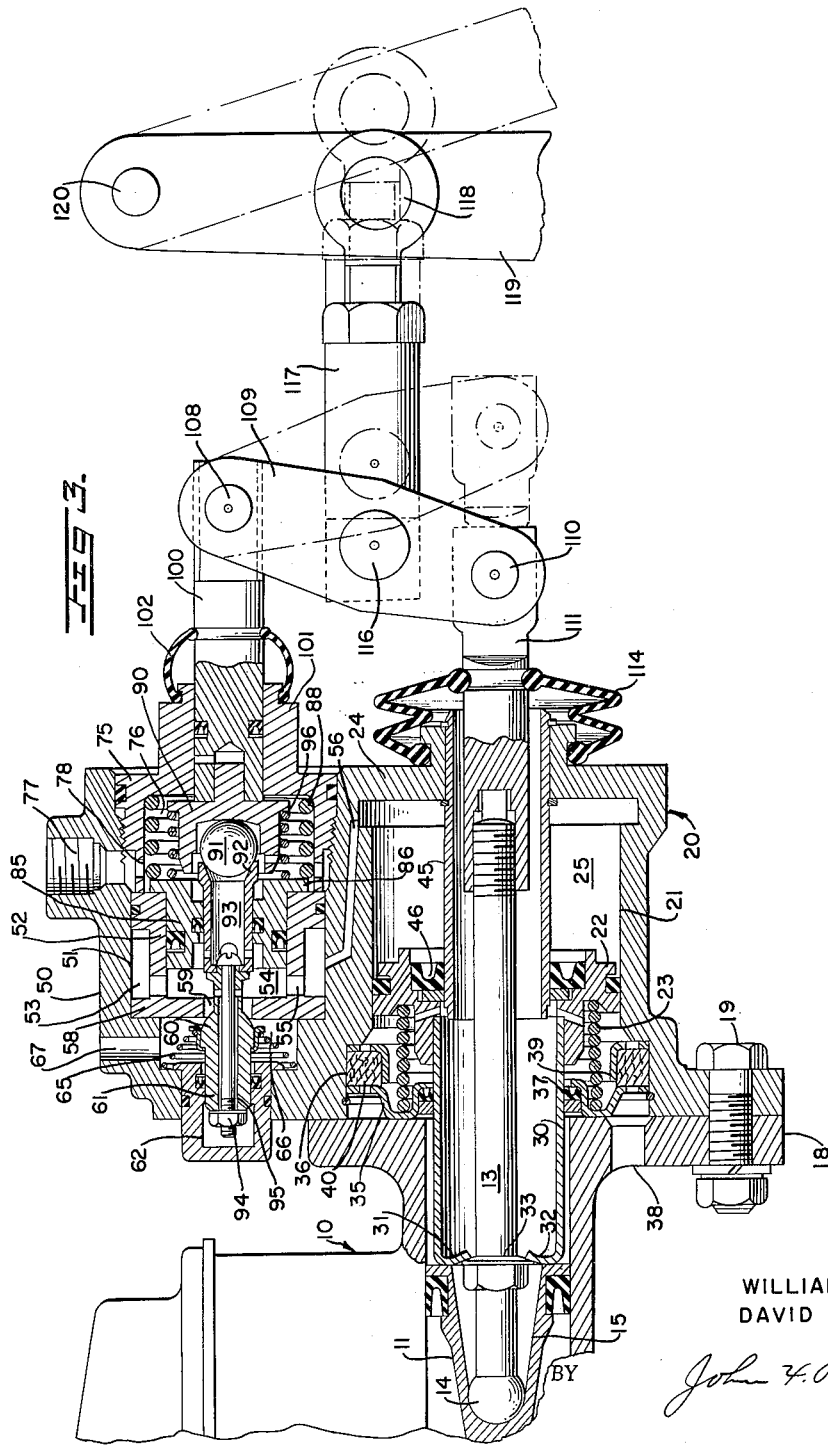
Figure 3 is a similar view showing the positions the parts will assume during brake actuation.

A reaction member 85 is slidable in the sleeve 52 and is provided with a shoulder 86 normally engaging the sleeve 52 to limit movement of the reaction member to its normal position shown in Figures 2 and 3. A spring 88 is arranged in the chamber 76 between the plug 75 and reaction member 85 to bias the latter to its normal position.

A cup 90 is arranged in the chamber 76 and has arranged therein a ball valve 91 engaging a seat 92 formed on the adjacent end of a tubular member 93 slidable through the reaction member 85 in sealed relation thereto. The tubular member 93 is connected to the valve body 61 by an axial bolt 94, and suitable passage means 95 affords communication between the chamber 54 and the cylinder 62 for a purpose to be described. The cup 90 is biased to the normal position shown in Figure 2 by a spring 96.

The cup 90 is suitably connected to an axially movable operating rod 100 therefor. This rod slides through a bearing 101 formed axially in the plug 75, and such bearing is sealed to the entrance of dust and other foreign material by a rubber or similar boot 102.

The outer end of the rod 100 is pivotally connected as at 108 to one end of a lever 109. The other end of this lever is pivotally connected as at 110 to a force transmitting member 111 arranged axially of the motor. The member 111 projects into the open end of the tubular member 45 and is preferably threaded on the push rod 13 as shown. The interior of the sleeve member 45 is protected by means of a rubber or similar boot 114.

Intermediate its ends, the lever 109 is pivotally connected as at 116 to one end of a push rod 117 the other end of which is connected as at 118 to a conventional preferably depending brake pedal 119, pivotally supported at its upper end as at 120.

Operation

The parts of the motor and valve mechanism normally occupy the positions shown in Figure 2. The valve 60 is closed, thus disconnecting the chambers 54 and 66. The valve 91 will be released from the seat 92, hence the chamber 54 will communicate through the tubular member 93 and valve seat 92 with the chamber 76. This chamber is at all times in communication with the sump 79 as will be apparent, the sump being at atmospheric pressure.

The mechanism is operated by depressing the pedal 119. Force thus will be transmitted through the push rod 117 to the pivot 116 to operate the lever 109. The conventional return spring (not shown) for the master cylinder piston 11 being substantially stronger than the spring 96 of the valve mechanism, the pivot point 110 momentarily will remain stationary and the pivot 108 will transmit force through the rod 100 to the cup 90. Thus the ball valve 91 will be seated to cut off communication between the chambers 54 and 76. The valve parts will now be in lap position.

Further movement imparted, in the manner referred to, to the ball valve 90 will now be transmitted through the tubular member 93 to the valve body 61 to unseat the valve 60. Fluid under pressure will then flow from the accumulator through line 68 (Figure 1) into the chamber 66, thence through port 59, chamber 54, ports 55, chamber 53, and passage 56 into the motor chamber 25. The admission of pressure fluid into the motor chamber 25 effects movement of the piston 22 to the left. This movement causes movement of the sleeve 30 and the shoulder 31 thereof, engaging the master cylinder plunger 11, will move such plunger to the left. The ball 14 on the end of the rod 13 will follow the plunger, and the pivot point 110 will start to move to the left of the position shown in Figure 2, the forces transmitted to the rod 13 being added to the force transmitted by the motor piston to actuate the master cylinder piston 11.

The area of the ball valve 91 open to the interior of the tubular member 93 will be subject to pressure admitted into the chamber 54, and pressure acting on the ball 91 opposes movement of the rod 100, and thus transmits reaction through the lever 109 and associated elements to the brake pedal. At this point it will be noted that the initial increment of movement of the brake pedal takes place solely against the loading of the spring 96. After the motor is initially activated, resistance to movement of the brake pedal increases in accordance with the pressure built up in the chamber 54 and in accordance with the area of the ball valve 91 exposed to such pressure, and accordingly increased reaction, still at a relatively low ratio, is transmitted to the brake pedal.

The operation referred to is continued until the desired degree of brake operation has been attained. After a predetermined pressure is built up in the chamber 54 through continued operation of the valve mechanism, the spring 88 will be overcome by movement of the reaction member 85 to the right, and this member will be moved into engagement with the inner end of the cup 90. A pressure responsive area equal to the diameter of the reaction member 85 will now be operative for transmitting pressure forces from the chamber 54 to the pivot 108 and thus to the brake pedal to provide a second and substantially higher reaction ratio, as is desired.

The valve mechanism described forms per se no part of the present invention but is described and claimed in the copending application of William Stelzer, Serial No. 652,433, filed April 12, 1957, now Patent No. 2,883,- 970, granted April 28, 1959. In accordance with the disclosure in such application, the diameters of the tubular member 93, port 59 and valve body 61 are equal, thus providing for a pressure balancing of the valves to prevent the necessity for exerting force operating against net pressures to operate the valve mechanism. Accordingly, the valve mechanism operates very smoothly and efficiently.

The motor of course can be activated only up to the extent made possible in accordance with pressure in the accumulator 69. If, in a panic stop, additional braking is desired, the operator can exert unlimited force against the pedal to increase the direct application of force through the rod 13 to the master cylinder plunger 11 to provide, if desired, the maximum possible brake application.

The brakes are released, as will be obvious, by the releasing of the brake pedal 119. Under such conditions, force against the rod 100 will be released, and the spring 96 will promptly return the cup 90 to normal position and the ball valve will open to relieve pressure from the chamber 54 into the chamber 76 and the pressure fluid will return to the sump through the pipe 78. The spring 65 will promptly close the valve 60 to disconnect the chambers 54 and 66 from each other, while the spring 23 will return the piston 22 to normal position, and the master cylinder plunger 11 will be moved to its off position by the conventional return spring (not shown). The flange edge 32, engaging the shoulder 33, limits axial movement of the rod 13 to its normal off position.

It will be noted that forces are transmitted to the master cylinder plunger 11 by the motor piston 22 and by the pedal operated push rod 13 wholly independently of each other. Under all normal conditions of operation, a predetermined proportion of the force for operating the plunger 11 is delivered by the motor and by the pedal operated push rod 13, acting simultaneously against the portions of the plunger 11 to which the two forces are delivered. It will be noted in Figure 2 that there is a relatively slight gap between the end of the cup 90 and the adjacent end of the reaction member 85. In the event of a failure of power in the source, initial operation of the brake pedal 119 will result in moving the cup 90 promptly into engagement with the reaction member 85, acting as a stop member for the cup 90. Further application of force to the brake pedal will transmit force to the pivot pin 116 to swing the lever about the now stationary pivot 108. The pivot pin 110 will thus transmit force directly through the members 111 and 13 to the master cylinder plunger 11. It will be noted that the push rod 13 is freely movable through the piston 22 and its sleeve 30, and accordingly, it will be apparent that direct manual actuation of the plunger 11 will take place under the conditions referred to without transmitting any forces to the motor piston 22. Thus the operator is not called upon to exert any force to overcome the frictional engagement of the piston 22 with the cylinder 21 or to overcome the loading of the spring 23. Obviously, if the piston were moved, the loading of the spring 23 would appreciably increase as brake application took place, and accordingly much of the force exerted against the brake pedal would be uselessly absorbed and not transmitted to the plunger 11. With the present construction, all of the forces, aside from negligible friction losses, will be transmitted from the brake pedal to the plunger 11 for the manual operation thereof to apply the brakes.

In view of the foregoing, it will be apparent that the present construction provides novel means for separately transmitting forces from the brake pedal and the motor piston to the master cylinder plunger, thus providing for the more efficient operation of the plunger 11 in the event of a failure of power in the motor. At the same time, the mechanism as a whole is highly efficient and provides an initial relatively soft brake pedal together with the provision of progressively increasing stages of reaction against the brake pedal, as is highly desirable. Moreover, the offsetting of the valve mechanism in the manner illustrated and the use of the lever 109 provides for a highly compacted arrangement of parts, which requires minimum space for installation in the vehicle.

It is to be understood that the form of the invention shown and described is to be taken as a preferred example of the same and that various changes in the shape, size, and arrangement of the parts may be made as do not depart from the spirit of the invention or the scope of the appended claims.

We claim:

1. A booster mechanism comprising a single device to be operated, a motor having a cylinder in axial alinement with said device, a piston in said motor having a pressure chamber at one side thereof, said motor having a head defining one end of said chamber, a tubular member carried by said head and projecting therethrough into said motor in relatively axially slidable relation to said piston and in sealed relation thereto, an operating rod projecting axially through said tubular member, said rod having one end directly engaging said device and its other end extending through said tubular member and projecting externally of said motor, said piston having a portion in force transmitting abutting relationship with said device whereby said operating rod is movable independently of said piston to operate said plunger, a valve mechanism controlling pressure in said chamber and normally relieving pressure therefrom, and pedal operable means comprising a lever connected at spaced points to said valve mechanism and to said other end of said operating rod to simultaneously transmit forces thereto including a force to said valve mechanism to operate it to connect said chamber to a source of high pressure to operate said piston.

2. A mechanism according to claim 1 wherein said pedal operable means comprises a pedal, and means connecting said pedal to said lever intermediate said spaced points.

3. A mechanism according to claim 1 wherein said valve mechanism includes an element subject to pressure equal to that present in said chamber and having mechanical connection with said pedal operable means to resist movement thereof to a degree proportionate to pressure in said chamber when said valve mechanism is operated.

4. A mechanism according to claim 1 wherein said pedal operable means comprises a pedal, means connecting said pedal to said lever intermediate said spaced points, and an element exposed to pressure equal to pressure in said chamber and having mechanical connection with said lever, whereby, when pressure is present in said chamber, said element will oppose operation of said valve mechanism by said lever in a predetermined ratio to pressure in said chamber.

5. A mechanism according to claim 1 provided with a second tubular member fixed at one end to said piston and having its other end constituting the portion of said piston in abutting engagement with said device to be operated, said second tubular member being of larger diameter than said first-mentioned tubular member whereby the latter is slidable into said second tubular member when said piston is in a normal off position.

6. A booster mechanism comprising a device to be operated, a pair of members having force transmitting engagement with said device to transmit movement thereto, one of said members being movable in a device-operating direction independently of the other member, a motor having a piston therein connected to said other member and having a pressure chamber at one side thereof, a valve mechanism externally of said motor comprising a pair of chambers one of which is a control chamber communicating with said motor chamber and the other of which is a high pressure chamber connected to a source of high pressure, a first valve normally closing communication between said control and high pressure chambers, a second valve normally opening communication between said control chamber and a source of lower pressure, lever means connecting said one member to said valve mechanism and operable to transmit movement to said second valve to close it and then open said first valve to connect said control and high pressure chambers with each other, said second valve being subject to pressure in said control chamber when said first valve is opened, pedal operable means connected to said lever means, said lever means being constructed to transmit pressure against said second valve to said pedal operable means, a secondary reaction device exposed to pressure in said control chamber and having a normal position in which it has lost motion connection with said lever means, and a spring biasing said secondary reaction device to a normal position whereby, when pressure in said control chamber increases to a predetermined point, said secondary reaction device will take up said lost motion connection to increase the ratio of reaction pressures transmitted to said pedal operable means.

7. A booster mechanism comprising a single device to be operated, a pair of members having direct force transmitting engagement with said device to transmit movement thereto, one of said members being movable in a device-operating direction independently of the other member, a motor having a piston therein connected to said other member and having a pressure chamber at one side thereof, said motor having a head forming a closure for said pressure chamber, a first tubular member projecting axially through said head and said piston and having sealed slidable engagement with said piston, said other member comprising a second tubular member connected at one end to said piston and having force transmitting connection with said device, said second tubular member being of larger diameter than said first tubular member whereby the latter is relatively movable axially into said second tubular member, said one member comprising a rod projecting axially through said tubular members, one end of said rod projecting through said first tubular member and beyond said motor, a valve mechanism externally of said motor connected between said pressure chamber and sources of different pressures and normally connecting said pressure chamber to the source of lower pressure, lever means connecting said end of said rod to said valve mechanism and operable to close communication between said pressure chamber and said lower pressure source and connect such chamber with the other source, and pedal operable means connected to said lever means.

8. A booster mechanism comprising a device to be operated, a motor having a cylinder in axial alinement with said device, a piston in said motor having a pressure chamber at one side thereof, said motor having a head defining one end of said chamber, a tubular member carried by said head and projecting therethrough into said motor in relatively axially slidable relation to said piston and in sealed relation thereto, an operating rod projecting axially through said tubular member, said rod having one end engaging said device and its other end extending through said tubular member and projecting externally of said motor, said piston having a portion in force transmitting abutting relationship with said device whereby said operating rod is movable independently of said piston to operate said plunger, a valve mechanism controlling pressure in said chamber and normally relieving pressure therefrom, pedal operable means comprising a lever connected at spaced points to said valve mechanism and to said other end of said operating rod to simultaneously transmit forces thereto including a force to said valve mechanism to operate it to connect said chamber to a source of high pressure to operate said piston, said valve mechanism including an element subject to pressure equal to that present in said chamber and having mechanical connection with said pedal operable means to resist movement thereof to a degree proportionate to pressure in said chamber when said valve mechanism is operated, a reaction device in said valve mechanism having a normal position in which it has lost motion connection with respect to said pedal operable means, and a spring biasing said reaction device to said normal position, said reaction device being exposed to pressure equal to that in said chamber whereby, when such pressure increases to a predetermined point, said spring will be overcome to take up said lost motion connection and provide resistance against movement of said pedal operable means in addition to that provided by said element.

9. A booster mechanism comprising a device to be operated, a motor having a cylinder in axial alinement with said device, a piston in said motor having a pressure chamber at one side thereof, said motor having a head defining one end of said chamber, a tubular member carried by said head and projecting therethrough into said motor in relatively axially slidable relation to said piston and in sealed relation thereto, an operating rod projecting axially through said tubular member, said rod having one end engaging said device and its other end extending through said tubular member and projecting externally of said motor, said piston having a portion in force transmitting abutting relationship with said device whereby said operating rod is movable independently of said piston to operate said device, a valve mechanism controlling pressure in said chamber and normally relieving pressure therefrom, pedal operable means comprising a lever connected at spaced points to said valve mechanism and to said other end of said operating rod to simultaneously transmit forces thereto including a force to said valve mechanism to operate it to connect said chamber to a source of high pressure to operate said piston, said pedal operable means comprising a pedal, means connecting said pedal to said lever intermediate said spaced points, an element exposed to pressure equal to pressure in said chamber and having mechanical connection with said lever, whereby, when pressure is present in said chamber, said element will oppose operation of said valve mechanism by said lever in a predetermined ratio to pressure in said chamber, a reaction device slidable in said valve mechanism and having a normal position in which it has lost motion connection with respect to said lever, and a spring biasing said reaction device to said normal position, said reaction device having an area exposed to pressure equal to the pressure in said chamber whereby, when said pressure increases to a predetermined point, said spring will be overcome and said lost motion will be taken up to resist movement of said lever in addition to the resistance provided by said element.

References Cited in the file of this patent

UNITED STATES PATENTS

| | | |
|---|---|---|
| 2,074,730 | Kerr | Mar. 23, 1937 |
| 2,241,374 | Alfieri | May 13, 1941 |
| 2,472,695 | Chouings | June 7, 1949 |
| 2,642,165 | Banker | June 16, 1953 |
| 2,644,305 | Price et al. | July 7, 1953 |
| 2,766,732 | Schultz | Oct. 16, 1956 |
| 2,775,957 | Anderson | Jan. 1, 1957 |
| 2,918,041 | Stelzer et al. | Dec. 22, 1959 |
| 2,925,805 | Schultz | Feb. 23, 1960 |

FOREIGN PATENTS

| | | |
|---|---|---|
| 640,542 | Great Britain | July 19, 1950 |
| 302,354 | Switzerland | Dec. 16, 1954 |
| 1,006,737 | Germany | Apr. 18, 1957 |